(12) United States Patent
Overland

(10) Patent No.: US 8,936,255 B2
(45) Date of Patent: Jan. 20, 2015

(54) STACKABLE SHOPPING BASKET WITH A PULL HANDLE

(75) Inventor: Roald Overland, Sauda (NO)

(73) Assignee: Superbasket A/S, Sauda (NO)

(*) Notice: Subject to any disclaimer, the term of this patent is extended or adjusted under 35 U.S.C. 154(b) by 0 days.

(21) Appl. No.: 13/582,783

(22) PCT Filed: Mar. 2, 2011

(86) PCT No.: PCT/IB2011/050879
§ 371 (c)(1),
(2), (4) Date: Sep. 5, 2012

(87) PCT Pub. No.: WO2011/110976
PCT Pub. Date: Sep. 15, 2011

(65) Prior Publication Data
US 2012/0326405 A1 Dec. 27, 2012

(30) Foreign Application Priority Data
Mar. 8, 2010 (SE) ....................... 1050214

(51) Int. Cl.
*B62B 1/00* (2006.01)
*B62B 5/06* (2006.01)
(Continued)

(52) U.S. Cl.
CPC . *B62B 5/06* (2013.01); *B62B 1/006* (2013.01); *B62B 1/125* (2013.01); *B62B 3/165* (2013.01); *B62B 5/067* (2013.01); *B62B 2501/02* (2013.01)
USPC ............... 280/33.998; 280/655.1; 280/47.371

(58) Field of Classification Search
USPC ............... 280/33.991, 33.998, 655.1, 47.131, 280/47.17, 47.315, 47.34, 47.371
See application file for complete search history.

(56) References Cited

U.S. PATENT DOCUMENTS 1,689,448 A * 10/1928 Moynahan ................. 280/47.26
5,984,327 A   11/1999 Hsieh et al.
(Continued)

FOREIGN PATENT DOCUMENTS

BE            467000 A    8/1946
WO    2006/056627 A1    6/2006
(Continued)

OTHER PUBLICATIONS

EPO, Int'l Search Report in PCT/IB2011/050879, Aug. 26, 2011.

*Primary Examiner* — John Walters
(74) *Attorney, Agent, or Firm* — Piedmont Intellectual Property

(57) ABSTRACT

The present invention relates to a stackable shopping basket (10A) comprising a bottom (14A), wheels, side walls, a carrying handle arrangement and a telescopic pull handle (20A) which is arranged in connection with one of the side walls and comprises a first and a second telescopic element (22A, 21A). At least one side wall (11A) is higher than one or more of the other walls, in association therewith (11A$_2$) a hollow metal profile is arranged which comprises said first telescopic element (22A). Its lower end is fixedly fastened to or in the lower end of said higher side wall (11A$_2$) and/or in the bottom (14A). The second telescopic element (21A) comprises a metal profile which is adapted for sliding in said first telescopic element (22A). In the extended position the second telescopic element (21A), at least to a large extent, is drawn out of the first telescopic element (22A), and in a stacked position it is substantially completely inserted in the first telescopic element (22A). The second telescopic element (21A) has a lower outer end which in an inserted position substantially reaches the lower end of the first telescopic element (22A), and an upper end which is provided with a handle (25A), which in a stacking position rests on an upper edge of the higher side wall (11A$_2$) or is taken up in seat (16A) provided therein.

17 Claims, 7 Drawing Sheets

(51) Int. Cl.
*B62B 1/12* (2006.01)
*B62B 3/16* (2006.01)

(56) References Cited

U.S. PATENT DOCUMENTS

| | | | | |
|---|---|---|---|---|
| 6,061,871 | A  * | 5/2000 | Wang | 16/113.1 |
| D546,511 | S  * | 7/2007 | Luster | D32/37 |
| 7,431,312 | B2 * | 10/2008 | Sebastian et al. | 280/33.998 |
| 7,494,136 | B2 * | 2/2009 | Alves et al. | 280/33.998 |
| D608,073 | S | 1/2010 | Alves et al. | |
| 8,297,628 | B2 * | 10/2012 | Zak | 280/33.998 |
| 8,297,629 | B2 * | 10/2012 | Gimeno Verdejo et al. | 280/33.998 |
| 2006/0103087 | A1 | 5/2006 | Alcala Sebastian | |

FOREIGN PATENT DOCUMENTS

| | | |
|---|---|---|
| WO | 2008/096003 A2 | 8/2008 |
| WO | 2009/151348 A1 | 12/2009 |

* cited by examiner

STACKABLE SHOPPING BASKET WITH A PULL HANDLE

TECHNICAL FIELD

The present invention relates to a stackable shopping basket, or a customer basket, intended to be used by a customer for transportation of goods in a shop, store, generally in self-service stores, supermarkets and similar. It comprises a bottom, two or more wheels so that the basket can roll on a floor or similar by being pulled or pushed, a basket wall arrangement, and a telescopic pull handle arranged in association with said sidewall arrangement.

BACKGROUND

Many different types of shopping baskets or customer baskets are known. Previously a shopping basket or a customer basket was intended to be carried by means of a carrying handle. Alternatives thereto are so called trolleys intended to be pushed or pulled on wheels. Later baskets have been introduced which are provided with a carrying handle so that the basket can be carried by the customer and which furthermore are equipped with wheels and a longer pull handle so that the basket also can be pulled or pushed by the customer. Since the shopping or customer basket only is used by a customer in or in connection to a store or a shopping center or similar, the baskets are kept in or close to the store or the shopping center, and in order not to occupy too much space, they are so formed that they can be stacked in one another. With respect to such shopping baskets or customer baskets several different problems have to be solved. The baskets have to be easy both to carry and to be pulled or pushed by the customer, and they must be wear resistent, they have to be able to receive several different types of goods, and they have to be strong so that also heavy articles can be transported in the basket. This puts requirements both on the construction of the basket and on the material that is used as well as on the carrying handle and on the pull handle. In addition thereto the shopping baskets have to be easy to stack and carrying handle as well as pull handle have to be easily accessible for the customer when a basket is to be pulled, fetched or when the handles are to be gripped after a temporary stop in the warehouse or similar and also be comfortable to pull and to carry.

In for example WO 2006/056627 an improved stackable basket is described which comprises both a carrying handle and a pull handle. The pull handle is telescopic and comprises two separate telescopic arms, i.e. a telescopic arrangement with two parts with a handle between ends of the respective telescopic arms. This solution, as other known solutions, comprises a telescopic arrangement with for each arm three telescopic elements, wherein the first telescopic element can be pushed into/pulled out of a second telescopic element which finally can be pushed into/pulled out of the third element which is formed of the shopping basket wall, which is made of plastic. In WO 2006/056627 the telescopic handle, as mentioned above, comprises, in addition to the gripping handle itself, two parts, or arms, which each consists of three elements. This causes problems since the different telescopic arms on one hand both consist of each three respective parts, and on the other hand since they slide in the actual plastic body of the basket itself. Problems are easily produced when sliding in a plastic material, since plastic in general is a very flexible material. Sliding in plastic furthermore results in problems with wear. Since an arm of the pulling handle arrangement consists of respective telescopic elements which are to be pushed into other telescopic elements, for a subsequent pushing into the basket body, problems arise in the respective transitions between different telescopic elements and the plastic wall of the basket respectively. The situation is the same when pulling out, first a telescopic element out of the plastic wall, then a telescopic element out of another, for each arm. This results in rendering it difficult for a customer to pull out and push in respectively such pull handles, which in turn results in a considerable risk for several shopping baskets being stacked or placed with the pulling handle in such a state that the elements are partly extended out of one another, which limits the stackability and also results in irritation, for customers and for store staff. In addition thereto the strength and the resistance to wear of the pull handle will be deteriorated, particularly in the joints between two telescopic elements and in the joint to the seat in the plastic wall. The telescopic elements can also be exposed to loads in an assymetric manner since two parallel elements connected by a handle also are exposed to a torque which can render extension and insertion difficult. A particular problem associated with the telescopic pull handles with two arms is that it upon extension, insertion, or even when there are vibrations or irregularities when during pulling, one of the arms, or one of its telescopic elements, can be inserted/extended more or less than the other, which has as a result that the pull handle in different ways can be damaged or get stuck, or become sluggish. A customer may then expose the pull handle for unnecessarily high loads, for example wrench it, which still further increases the risk for the occurrence of damages. Shopping baskets are frequently used which means that they are removed from where they are stacked, the pull handle is withdrawn, extended, they are pulled, the pull handle is inserted and they are stacked again, a large number of times, which has as a result that they are exposed to considerable loads. It is thus of the utmost importance that the pull handle easily can be inserted/extended without neither the telescopic elements nor the joining regions between telescopic elements, joints, and attachments are damaged or exposed to too much wear which might have as a result that the shopping basket could not be used anymore.

SUMMARY OF THE INVENTION

It is therefore an object of the present invention to provide a stackable shopping basket as initially referred to, with which the pull handle easier can be extended and inserted than with known arrangements. It is also an object of the invention to provide a stackable shopping basket which is more robust, which has a stronger and more stable pull handle, which furthermore is less sensitive to unbalanced forces, wear through repeated extensions and insertions, and which particularly is capable of handling high weights. It is also an object to provide an arrangement wherein the pull handle fast and without requiring any force can be extended and drawn in respectively, without running the risk of getting stuck or suffering from applied unbalanced forces. It is furthermore an object to provide an improved stackable shopping basket which is easy and comfortable to pull or push, easy to stack and wherein the risk that the basket is put aside with a completely or partly extended handle is minimized. A further object is to provide a stackable shopping basket with which heavier loads can be pulled than with hitherto known baskets, without running the risk that the pull handle, fastening means or the regions where it is attached to the basket, are negatively affected, worn out, teared, bent or twisted, which in turn would prevent or make collapsing of the handle and stacking, or extension of the handle and pulling, more difficult.

Therefore a stackable shopping basket as initially referred to is provided which has the characteristics given in the characterizing part of claim 1. Preferred embodiments are given by the features of the appended subclaims. Preferably, but not necessarily, the stackable shopping basket furthermore comprises a carrying handle arrangement. It is an advantage of the invention that, since the pull handle arrangement comprises one single first telescopic element, which is made of a hollow metal profile, and which is fastened to an inner or outer surface of one of the sidewalls of the shopping basket, or is moulded into it, and/or fastened at the bottom thereof, and in which an inner metal profile, which forms an inner telescopic element, can be displaced, drawn in and extended respectively, i.e. metal is sliding in metal, and the arrangement becomes stronger and less exposed to wear or twisting, uneven loads or unbalanced forces.

It is furthermore an advantage that the basket wall, in connection with which or in which the telescopic arrangement is arranged, is higher than at least one other wall or wall section which is opposite to this wall, preferably higher than all other basket walls or wall sections, which has as a consequence that only one telescopic element, which is slideable in another telescopic element, is needed in order to obtain a full length, i.e. a length which is sufficient for a customer to allow comfortably pulling or pushing the shopping basket. Since only a few elements are required for the telescopic element, the risk for damages will be reduced, exposure to wear of the pull handle will be considerably reduced, and the life time of the shopping basket will increase considerably.

BRIEF DESCRIPTION OF THE DRAWINGS

The invention will in the following be further described, in a non-limiting manner, and with reference to the accompanying drawings, in which.

DETAILED DESCRIPTION

Figure 1:
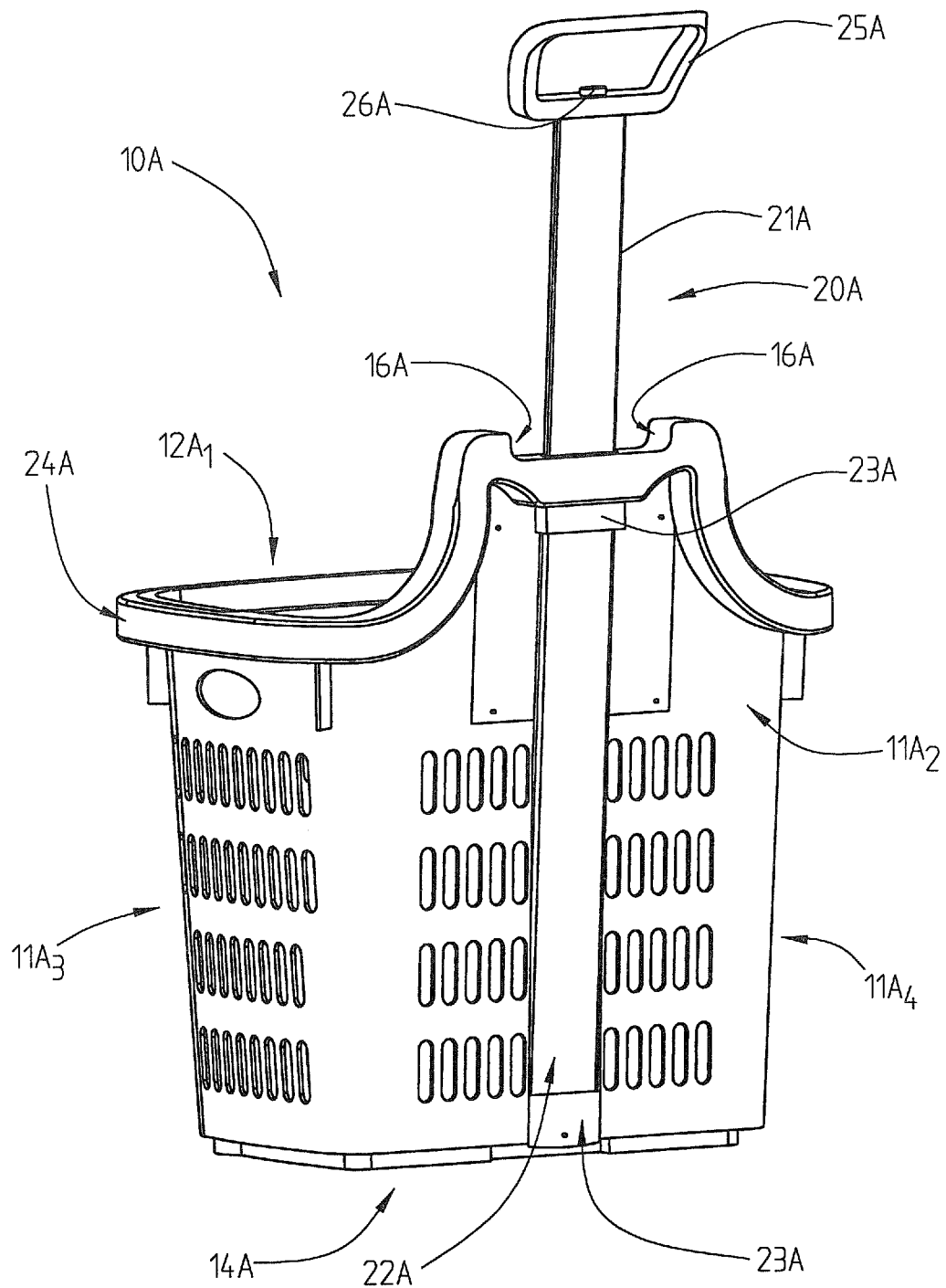
FIG. 1 shows a first embodiment of a stackable shopping basket seen from the back side and illustrating a telescopic element in an extended position and which is arranged in connection to the outer side of the rear wall.

FIG. 1 shows a first example of a stackable customer or shopping basket 10A, intended for temporary use by a customer for transportation of goods in a store, a shop, a supermarket or similar. The shopping basket comprises a bottom 14A, two or more, for example four, five or three wheels (not shown) which can be arranged in an arbitrary manner under the basket so that it can roll on a floor or similar when being pulled or pushed. It also comprises a basket side wall arrangement which here consists of four side walls, a first side wall $11A_3$ and a side wall $11A_4$ opposite to this wall, a rear wall $11A_2$ and a front wall located oppositely to said rear wall. The shopping basket also comprises a carrier handle arrangement 30A which can be seen in FIG. 3 and a telescopic pull handle 20A arranged in connection with the rear wall $11A_2$ forming part of the basket side wall arrangement.

The basket side wall arrangement can be formed in one piece consisting of what here is denoted wall sections, in connection to the bottom surface or the bottom part, but it may also comprise separate, joined side walls. The telescopic pull handle 20A comprises a first telescopic element 22A and a second telescopic element 21A. At least the first wall section or a first wall portion has a height in relation to said bottom surface which exceeds the height of at least one other side wall or the other wall sections, i.e. the other sections or walls of said basket side wall arrangement. Particularly it can be the rear portion of the wall arrangement, as in this embodiment, but it can also be any other of the side walls or wall sections. The important thing is that least one of the side walls or that one wall section is so high that the telescopic pull handle only has to comprise a first and a second telescopic element, one of which reaches up to an upper border, or somewhat below such a border, of said higher wall or wall section and that the telescopic pull handle still, in its extended state, shows such a length that the shopping basket comfortably can be pulled by a customer of normal length or taller. Preferably the total length of the telescopic pull handle, which hence comprises only two parts, is at least 70 cm, preferably 80-85 cm, or up to 100 cm or more. The first telescopic element 22A comprises a hollow metal profile and the second telescopic element 21A also comprises a metal profile which may be hollow or not, and which is intended to slide in said first telescopic element 22A.

The lower end (alternatively also the upper end and/or intermediate section) of said first telescopic element 22A is fixedly mounted at or in, at least the lower part of the higher side wall $11A_2$, possibly also at or in an upper part thereof, see above, through fastening means 23A, for example consisting of a flange at the lower part of the higher wall and to which the telescopic element is screwed, riveted or similar. Alternatively some other anchoring means can be used. It can also be fastened to or in the bottom adjacent to said higher sidewall 23A.

The second telescopic element 21A runs or slides in said first telescopic element 22A substantially all the way down to said anchoring point. The anchoring point normally does not consist of a point but it can be formed in any arbitrary manner, as mentioned above, the essential thing being that the lower part of the first telescopic element 22A is fixedly mounted at or close to the lower part of the higher side wall. At the upper edge of the first telescopic element 22A and/or at the lower edge of the second telescopic element 22A blocking means or stopping means are arranged, in any desired manner, in order to prevent that the second telescopic element 21A in its extended state can be drawn out of the first telescopic element 22A. The blocking means may for example comprise a groove or a protrusion on either of, or both of, the telescopic elements. At or on the upper part of the second telescopic element 21A a handle or a gripping part 25A is arranged which is suitable for gripping by a customer. At the interconnection of the upper part of the second telescopic element 21A with the gripping part 25A or the handle, a blocking button 26A or similar may be arranged in order to enable releasing of the second telescopic element 21A and the gripping means 25A respectively from the upper border of the higher wall $11A_2$, or from a frame or similar arranged at the upper border, so that when said blocking button 26A is being actuated upon by a customer, the pull handle 25A can be extended for pulling of the basket and transportation of goods. Preferably the second telescopic element is automatically pushed out of the first telescopic element through the releasing of a blocking element and a spring, for example a compression spring or a tension spring, pushes/pulls it out.

The upper telescopic element of telescopic part is thus preferably spring loaded (for example by means of a compression spring) so that upon releasing of a blocking function, it will automatically be pushed out, and will then remain in an extended position until a locking or blocking means, which locks it in an extended position, is released by pressing a button, and then the extended telescopic element can return, manually or automatically, for example by means of a spring, e.g. a tension spring or (another) compression spring.

When the basket again has to be stacked, the second telescopic element 21A is simply drawn in into the first telescopic element 22A, manually or it is automatically drawn in via a (possibly second) spring element when a blocking means (not shown), which locks the pull handle in an extended position according to the above, is released. This is advantageous for several reasons, for example does the handling become easier, something can be hanged onto the handle etc.

The upper of the basket side wall arrangement may, completely or partly surrounding it, be provided with an upper edge or frame and it may be provided with a recess 16A or similar adapted to receive the gripping part 25A, for example by being so shaped that it is congruent with the handle or the gripping part 25A.

The gripping part 25A may of course have many different forms. It does not have to be a handle with an opening in it for a hand, but it can also be an ergonomically shaped gripping element adapted to be able to be partly enclosed by a hand or similar.

Also the basket can have many different forms, appropriately, however, it is made of plastic and is provided with orifices as is well known. To enable stackability, the cross section of the basket is smaller at the lower end than at the upper end and it increases upwardly in a manner which is known per se.

The carrying handle arrangement, if there is such an arrangement provided at all, can be formed in many different manners, it may comprise a carrying handle or two carrying handles, the essential thing being that it is/they are so formed that the basket is stackable, and for example can be folded down to rest on the edge or the frame of the basket, within the edge or outside the frame, or be prevented from falling down by means of blocking means at the locations where the handle or the handles are hinged to the upper edge of the basket sidewall portion or to a frame 24A surrounding it.

Due to the fact that the cross sectional area of the basket (in parallel with the floor surface) decreases downwardly, the telescopic pull handle can have a certain angle of inclination in an extended position. It is also possible to arrange the upper telescopic part so that it forms a somewhat larger angle with respect to the lower part in an extended position and that the angle of inclination is given by delimiting elements arranged at or in the upper part of the first telescopic element, possibly cooperating with engagement means at the lower end of the second telescopic element. Many different variations are possible.

Figure 2:
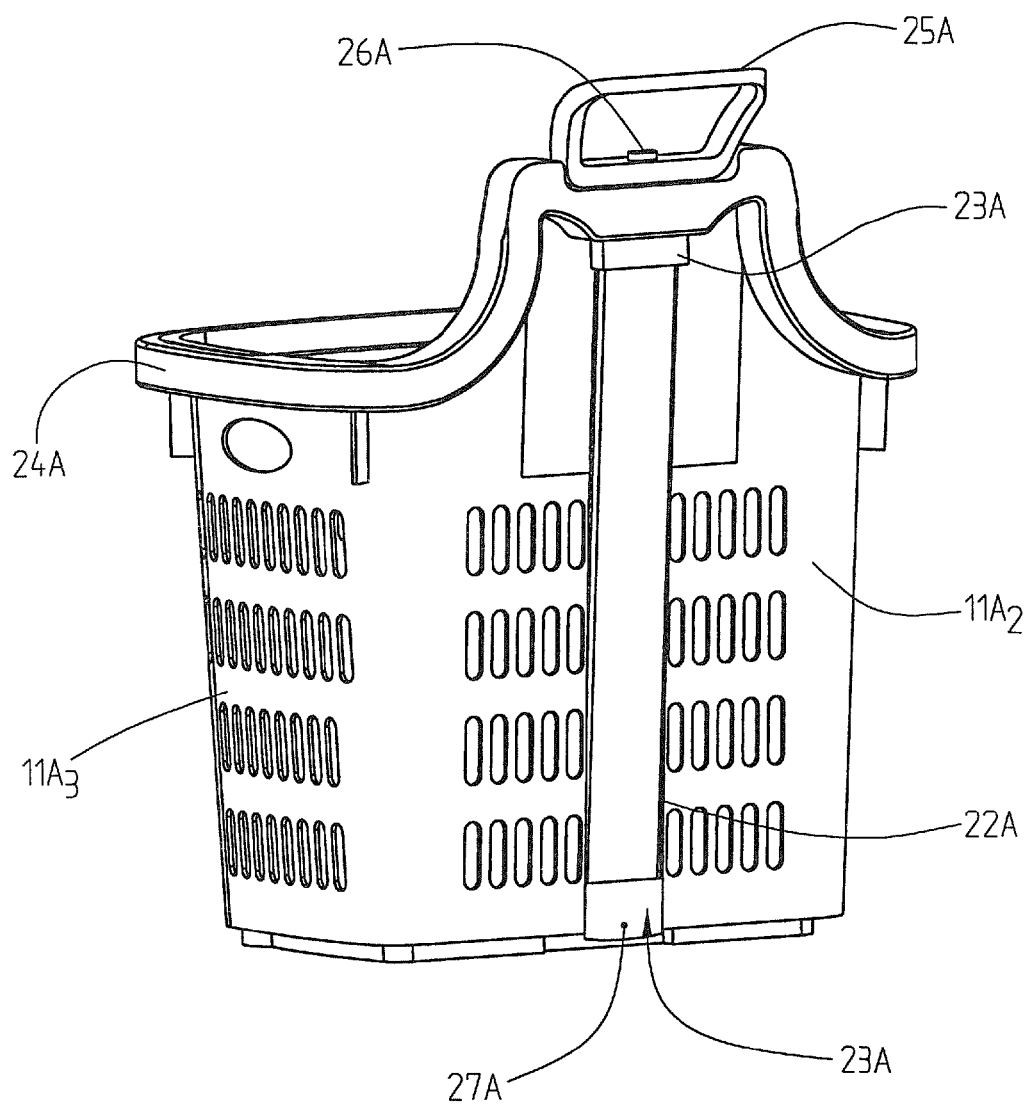
FIG. 2 shows an embodiment according to FIG. 1 with the pull handle in an inserted state, stacking position.

FIG. 2 schematically illustrates a shopping basket 10A according to FIG. 1 with the telescopic pull handle in an inserted or retracted position. By means of a button or a blocking element 26A blocking means (not shown), which can be formed in a large number of different ways, are released, so so that the second telescopic element will be released and can be extended or locked respectively with blocking means in an active position, in an inserted position. The blocking means may for example comprise a hook, one or more pins or similar (at the upper part of the second telescopic element or at a surrounding rim or edge) which can come into engagement with one or more corresponding openings at the upper edge of the first telescopic element or vice versa. The essential thing is that a total length of the pull handle in its extended position, which at least is long enough to be satisfactory, can be provided for with but two elements and that the lower part (the first telescopic element) is fixedly anchored at the lower part of the shopping basket.

The first and the second telescopic element respectively can have a rectangular cross section or an oval cross section or any other appropriate cross sectional shape. Appropriately the dimension which is parallel with the higher wall is considerably larger than the dimension that extends perpendicularly thereto in order to achieve stability and in order not to reduce the stacking capability or result in the basket having a wall with a larger protruding portion, irregularity, at the basket wall, than absolutely necessary, if the first telescopic element is arranged in the connection with the inside or the outside of the basket. The first telescopic element can be so arranged that it is fixed somewhat outside and adjacent the outer side of the basket rear wall as in FIGS. 1 and 2, or it can be so arranged that it is fixed on the inside of the basket wall as is shown in a simplified manner in FIG. 5. In another advantageous implementation the first telescopic element is moulded into a basket wall which is higher than at least its opposing wall (or the other basket walls or sections). This higher wall can then be so formed that it is somewhat thicker than the other walls, and the metal telescopic element is fixed, integrated, therein.

In an advantageous embodiment the higher side wall or wall section comprises, at its inner side, facing the inside of the wall, a seat or holding means adapted to take up or hold information, advertising or similar, that can be added and removed in a simple way and which becomes well visible through the fact that this wall is higher than at least an opposite wall.

Figure 3:
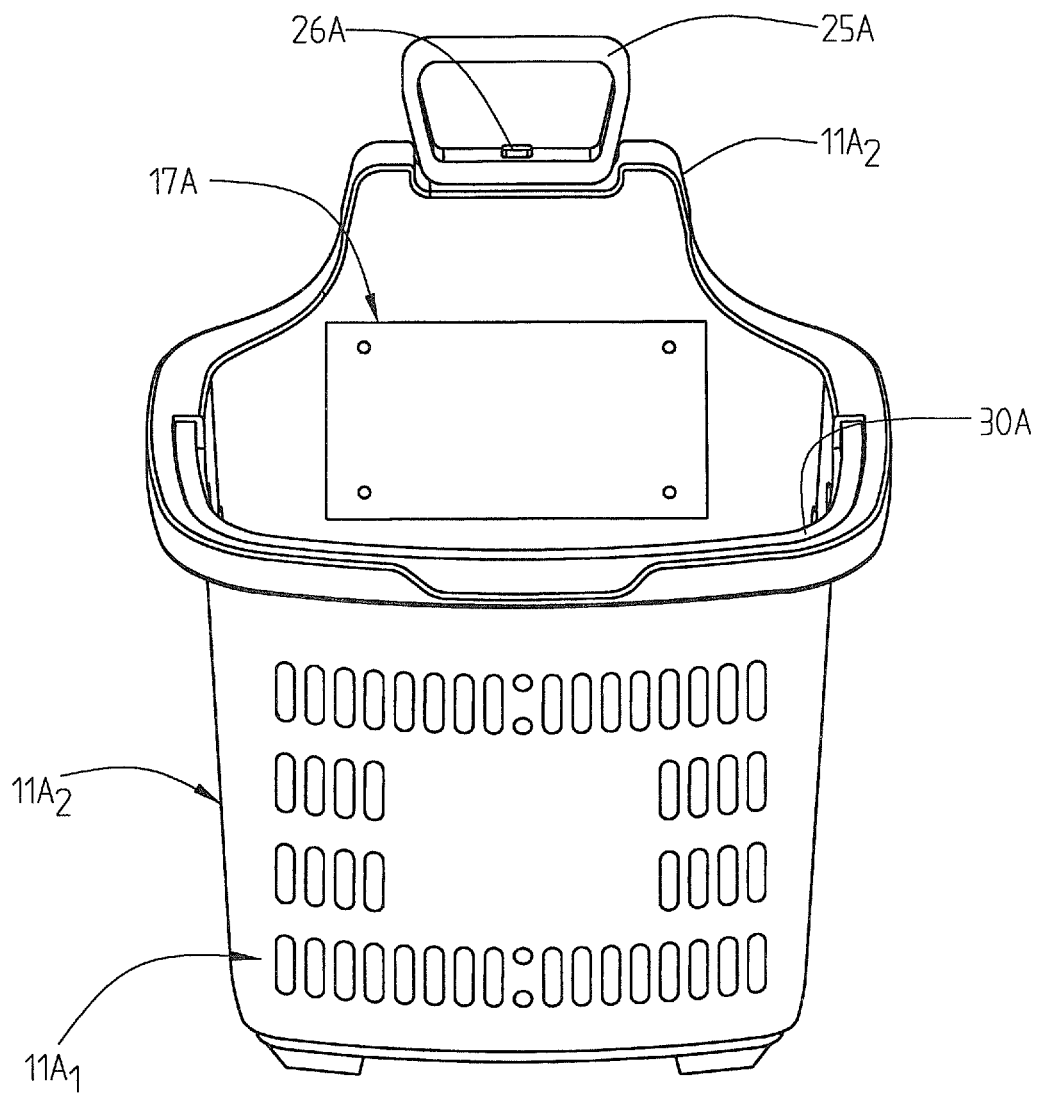
FIG. 3 shows a stackable shopping basket according to FIGS. 1, 2 seen from the wall which is opposite the wall at the outer side of which the telescopic pull handle is arranged.
Figure 4:
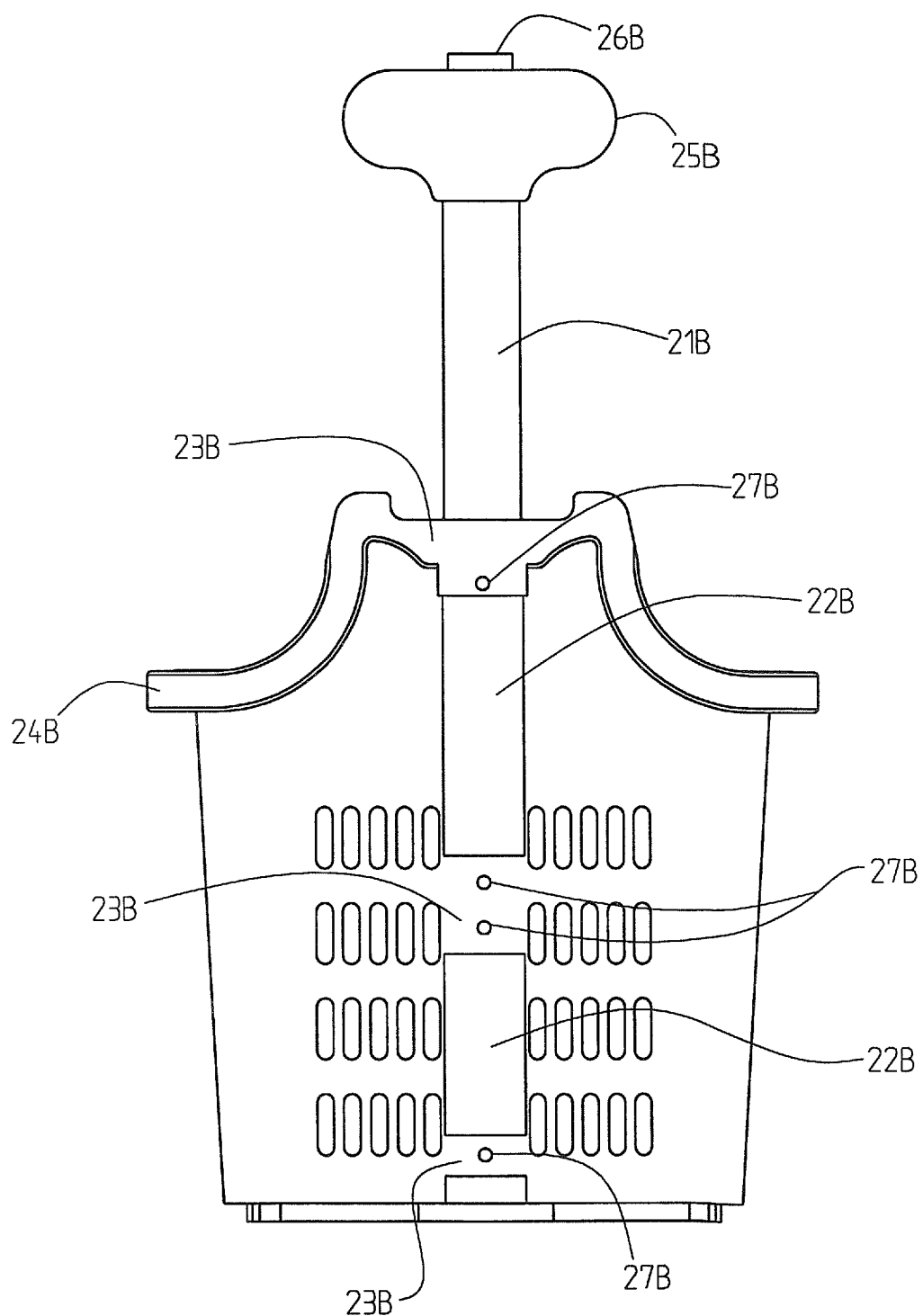
FIG. 4 shows in a simplified manner an example of an alternative embodiment of a gripping means, FIG. 5 in a simplified manner shows an alternative embodiment wherein the telescopic arrangement is arranged in connection with the inner side of a higher wall section, FIG. 6 schematically illustrates still a further alternative embodiment wherein the telescopic pull handle is moulded into a higher side wall.

FIG. 4 shows in a very simplified manner a stackable shopping basket according to an alternative embodiment wherein the gripping means 25B of the telescopic pull handle 20B is differently formed and at the top thereof is provided with a button 26B for releasing, enabling extension, of the second telescopic element 21B as described with reference to FIGS. 1-3. Mounting means/mounting areas 23B are only indicated schematically and may have different constitutions; for example may the second telescopic element be fixed by means of rivets, screws 27B or similar. Such rivets or similar are however not necessary but can be dispensed with and fastening or mounting can take place in any other convenient way. The gripping part 25B here for example comprises an ergonomically shaped knob with a locking button 26B.

Figure 5:
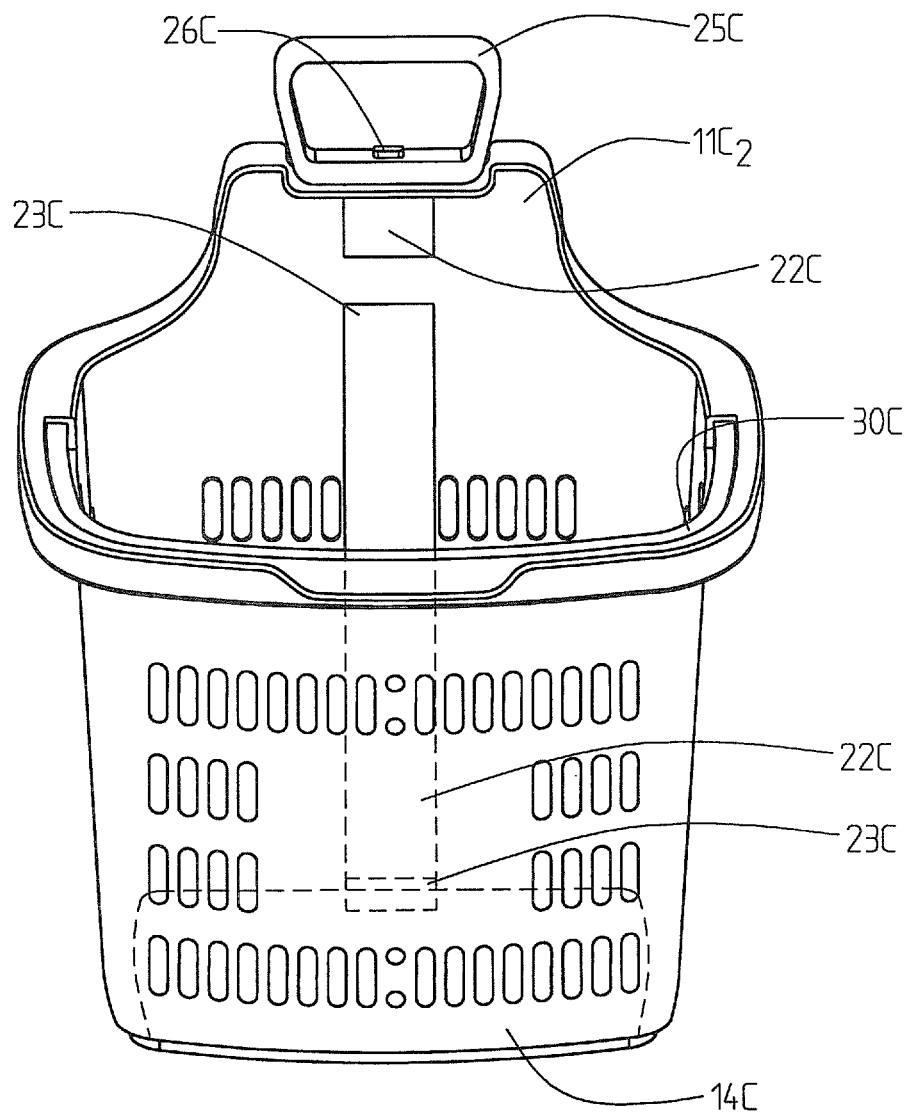
Figure 6:
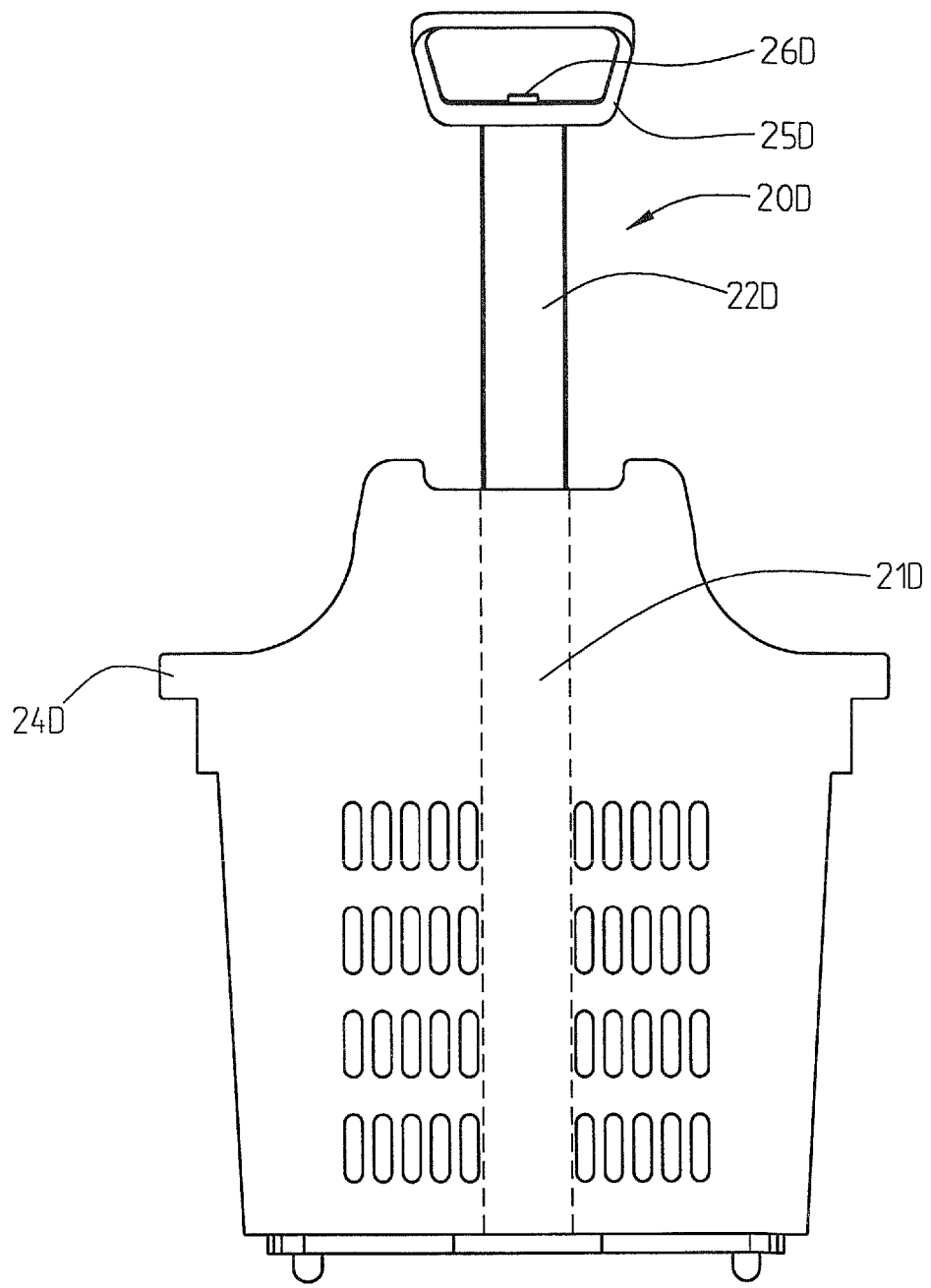
Figure 7:
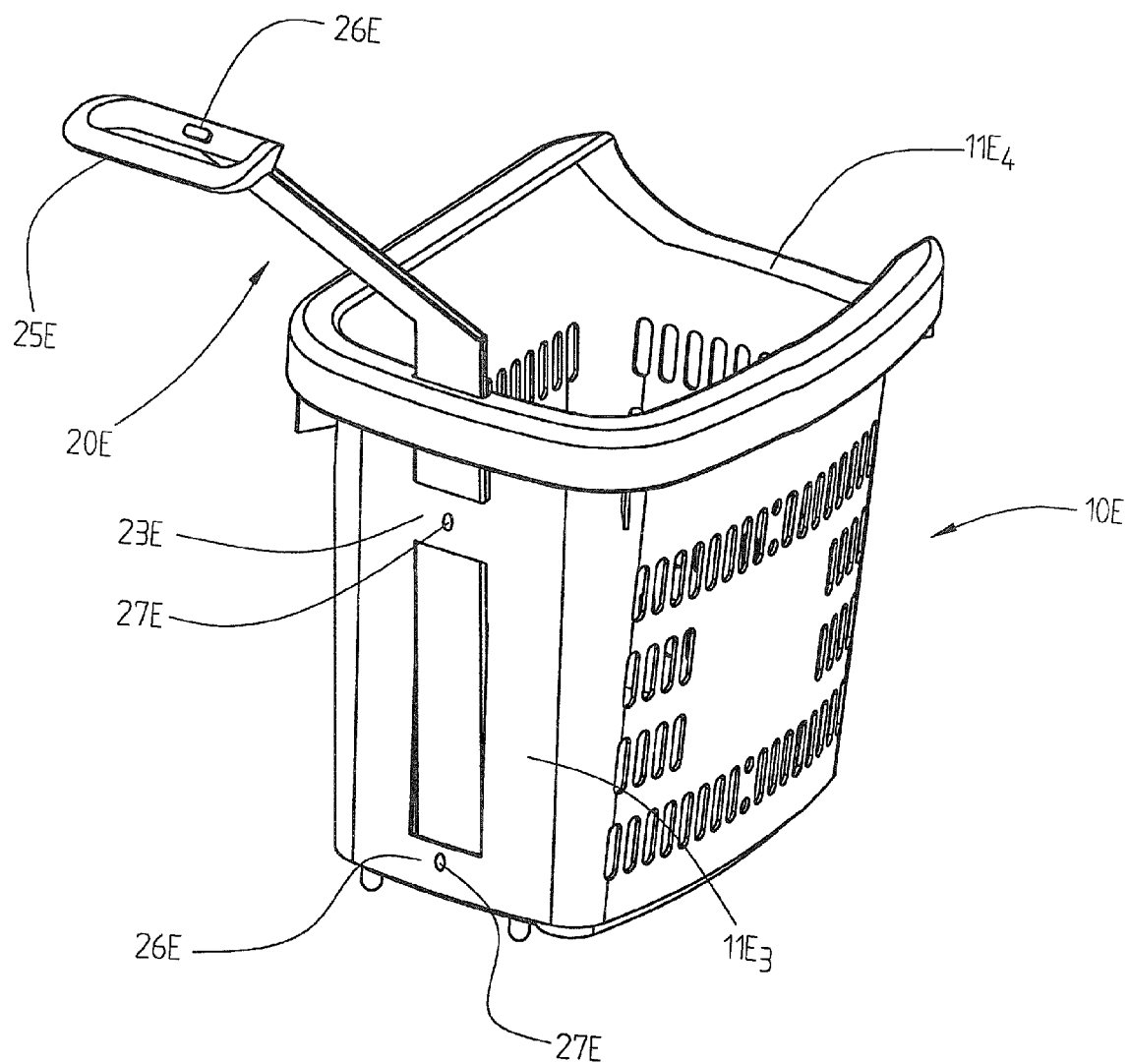
FIG. 7 shows a simplified embodiment wherein the pull handle is arranged at a narrower and higher rear wall.

Reference numbers with indices "C", "D", "E" in FIG. 5-FIG. 7 relate to corresponding elements shown in the preceding figures with indices "A", "B".

FIG. 5 shows still a further alternative implementation of a stackable shopping basket 10C with a telescopic pull handle arrangement 20C arranged in connection with the inside of a higher wall $11C_2$.

For reasons of clarity there are no wheels illustrated in several of the figures.

FIG. 6 shows in a very simplified manner still another alternative embodiment of a stackable shopping basket 10D with a telescopic pull handle 20D so arranged that the first telescopic element is completely moulded into the higher wall $11D_2$ and it is thus not visible.

Finally, FIG. 7 shows an alternative embodiment of a stackable shopping basket 10E wherein the higher wall comprises one of two narrower walls 11E$_3$, this in order to show that the wall that has an increased height or is higher than at least one other wall or another wall section of the basket, if this has a more or less rectangular cross section, either may consist of the narrower wall or of the broader wall. The basket, however, does not necessarily have a rectangular cross section but it may also be oval, irregular, circular etc.

In FIG. 7 only one wall 11E$_4$ is lower than the higher side wall 11E$_3$ but of course also the other walls can be lower as in the other embodiments. The pull handle 20E (the upper part) is here arranged at an angle somewhat exceeding the angle that is obtained through the mere inclination of the wall 11E$_3$ due to an upwardly increasing cross section for reasons of stackability, which however only relates to an alternative example. The second telescopic element is here thus arranged to form an angle in relation to the inclination angle of the first telescopic element, which is given by the inclination of the wall, but it is located in the same vertical plane which is perpendicular to the bottom surface of the basket/the floor centrally through the wall where the carrying handle is located and the opposite wall.

The invention is of course not limited to the illustrated embodiments but can be varied in a number of different ways within the scope of the appended claims.

Particularly the handle or the gripping means can be shaped in many different manners. Furthermore can, in connection thereto, provided locking buttons or similar activation means be formed in many different manners, at different locations and be placed differently in relation to the handle; at the upper part, on a lateral side, on an inner or on an outer side, directed upwards or downwards. There may also be one or two locking buttons or similar, one for releasing for manual or automatic pushing out of the second telescopic element, and one for manual or automatical insertion of the same. Alternatively there is only one locking button or similar providing for both functionalities. Also locks or blocking means, springs and similar can be provided for in many different mayness as long as the desired functionality is achieved which can be automatical extension/withdrawal or alternatively release so that manual extension/withdrawal becomes possible, as well as blocking of the second telescopic element in an extended position, possibly also in a withdrawn position.

The basket can also be formed in many different ways, and can be provided with two or four wheels, or any other appropriate number.

The invention claimed is:

1. A stackable shopping basket for use by a customer for transportation of goods in a store, comprising:
   a bottom;
   two or more wheels configured for enabling the basket to be rolled on a floor; and
   a basket wall arrangement comprising one or more side walls or wall sections, a pull handle arranged in connection with a first side wall or first wall section of the basket wall arrangement and having a height in relation to the bottom that exceeds a height of at least one other side wall or other wall section of the basket wall arrangement, and a grip handle that, at an inserted stacking position, is configured either for resting on an upper border of a higher portion of the first side wall or higher portion of the first wall section, or for being taken up in a seat provided at an upper edge of the first side wall or first wall section, a width of the higher portion of the first side wall or higher portion of the first wall section being less than a width of the first side wall or first wall section; wherein the pull handle comprises a first telescopic element and a second telescopic element, the first telescopic element has a hollow metal profile with an upper end and a lower end, the first telescopic element is arranged in connection to or in the higher portion of the first side wall or higher portion of the first wall section, and the lower end is at least one of fixedly secured to a lower end of the higher portion of the first side wall or higher portion of the first wall section and fixedly secured at or in the bottom; the second telescopic element has a metal profile with a cross section that is smaller than a cross section of the first telescopic element, the second telescopic element is configured to slide in the first telescopic element, the second telescopic element in an extended position is at least substantially drawn out of the first telescopic element, the second telescopic element in an inserted position is substantially completely retracted into the first telescopic element, and the second telescopic element has a lower outer end which in the inserted position substantially reaches the lower end of the first telescopic element.

2. The stackable shopping basket of claim 1, wherein the telescopic pull handle in the extended position has a total length of at least about 70 centimeters.

3. The stackable shopping basket of claim 1, wherein the first and second telescopic elements have rectangular or oval cross sections.

4. The stackable shopping basket of claim 3, wherein the cross sections of the first and second telescopic elements have longitudinal axes that are parallel with the first side wall or wall section and that are at least twice as long as transverse axes of the cross sections of the first and second telescopic elements.

5. The stackable shopping basket of claim 4, wherein the first telescopic element is arranged at or adjacent an outer side of the first side wall or wall section, and is configured to bear on or face an underlying shopping basket when in the inserted position.

6. The stackable shopping basket of claim 4, wherein the first telescopic element is molded into the first side wall or first wall section.

7. The stackable shopping basket of claim 4, wherein the first telescopic element is arranged at or adjacent an inner side of first side wall or wall section.

8. The stackable shopping basket of claim 1, wherein the basket wall arrangement comprises two pairs of opposite, facing, side walls or wall sections; and a cross section of the basket parallel with the bottom is oval, circular, or rectangular, and is larger at an upper edge of the basket than at the bottom.

9. The stackable shopping basket of claim 8, wherein the higher portion of the first side wall or wall section has a height that exceeds a height of the opposite side wall or wall section, and a mount provided on an inner side of the higher portion of the first side wall or wall section that faces the inner bottom surface is configured for holding information.

10. The stackable shopping basket of claim 1, wherein the pull handle, in the extended position, has a full length that includes the respective lengths of the first and second telescopic elements with the second telescopic element fully extended; a blocking arrangement is provided at at least one of an upper part of the first telescopic element and a lower part of the second telescopic element, and the blocking arrangement is configured for preventing separation of the first and second telescopic elements from each other or for limiting length of withdrawal so that the first and second telescopic elements can be locked to one another at least in a substantially completely extended position.

11. The stackable shopping basket of claim 1, wherein the second telescopic element at its upper part includes a handle or a grip, and in or adjacent the handle or grip a blocking or activating device is provided; the activating device is configured, when actuated, for releasing the second telescopic element in the inserted state so that the second telescopic element can be manually drawn out or automatically extended; and the blocking device is configured for blocking the pull handle in an extended position.

12. The stackable shopping basket of claim 11, wherein on or in connection with at least one of the grip, the blocking device, and the actuating device, a separate blocking device or actuator device is provided that is configured, upon actuation, for releasing the second telescopic element when it is locked in the extended position, whereby the second telescopic element can be retracted.

13. The stackable shopping basket of claim 1, wherein the bottom and the basket wall arrangement are made of plastic, and the carrying handle includes a handle configured, in a retracted position, to rest on the upper border or frame of the side wall or wall section that is opposite the first side wall or wall section, or to rest on an edge or a stopping member on or adjacent the upper border at its inner or outer side, or in connection with carrying handle provided connection points, the carrying handle is arranged at one or two side walls or wall sections adjacent the first side wall or wall section.

14. The stackable shopping basket of claim 1, wherein a total length of the pull handle in an extended state is about 75-100 centimeters, and a height of the higher wall or wall section is about 38-55 centimeters.

15. The stackable shopping basket of claim 1, wherein the first telescopic element is arranged at or adjacent an outer side of the first side wall or wall section, and is configured to bear on or face an underlying shopping basket when in the inserted position.

16. The stackable shopping basket of claim 1, wherein the first telescopic element is molded into the first side wall or first wall section.

17. The stackable shopping basket of claim 1, wherein the first telescopic element is arranged at or adjacent an inner side of first side wall or wall section.

* * * * *